F. KUEMPEL.
Sled-Runner Attachment for Vehicles.
No. 198,748. Patented Jan. 1, 1878.
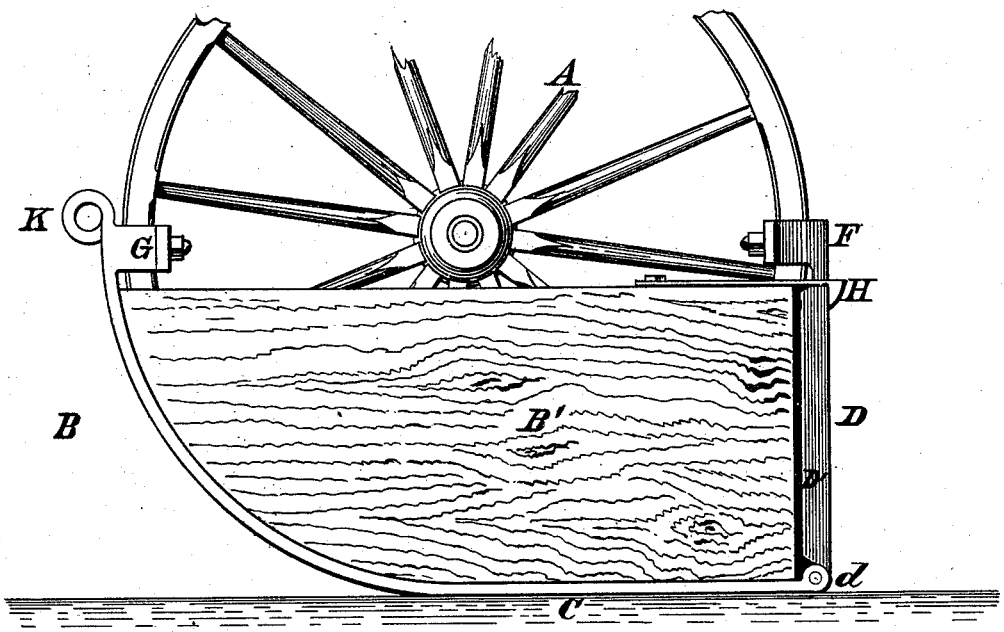
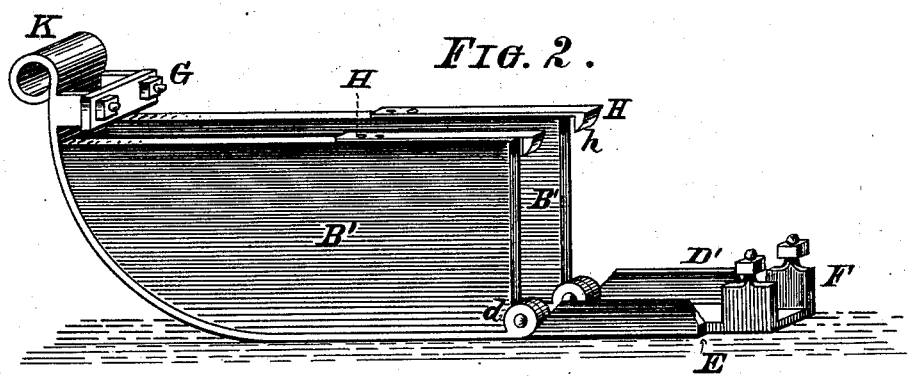
Fig. 2.
Witnesses:
Frank Hirsch
Chas. Brosart
Inventor:
Fred Kuempel,
by Michael J. Stark
his Atty.

UNITED STATES PATENT OFFICE.

FREDERIC KUEMPEL, OF BUFFALO, NEW YORK.

IMPROVEMENT IN SLED-RUNNER ATTACHMENTS FOR VEHICLES.

Specification forming part of Letters Patent No. 198,748, dated January 1, 1878; application filed December 13, 1877.

*To all whom it may concern:*

Be it known that I, FREDERIC KUEMPEL, of Buffalo, in the county of Erie and State of New York, have invented certain new and useful Improvements on a Sled-Runner Attachment for Vehicles; and I do hereby declare that the following description of my said invention, taken in connection with the accompanying sheet of drawings, forms a full, clear, and exact specification, which will enable others skilled in the art to which it appertains to make and use the same.

This invention has special reference to a sled-runner attachment to wheeled vehicles; and it consists in the peculiar arrangement of parts and details of construction, as hereinafter first fully described, and then pointed out in the claim.

In the drawings heretofore mentioned, Figure 1 is an elevation of my improved sled-runner attachment as applied to a vehicle-wheel. Fig. 2 is a perspective view of the same detached.

Like letters of reference indicate similar parts in both figures.

A is a vehicle-wheel of any of the well-known or special constructions, to which is removably attached the sled-runner B. This sled-runner consists of the metallic runner C and two side walls or guards, B', the latter being secured to the former in any suitable manner, and placed a sufficient distance apart to admit the said wheel A between them. The walls B' may be made of wood or metal, and of any desired configuration, and may be a skeleton frame-work, so long as they reach up on both sides of the wheel high enough to serve as a guard and prevent displacement of said runner.

D is a flap or plate, hinged to the runner C at $d$, and serving as a head or means for closing the box-shaped guards B'. This plate is formed with side wings D', overlapping the guards B' on their rear end, to retain them in proper position, and it is provided with offsets E on each side, serving as a catch, to act, in conjunction with two spring-hooks, H, as a means for locking said flap to the guards B' B'. The upper extremity of this flap is formed into a clip, F, by means of which the rear ends of the guards are fastened to the fellies of the wheel A.

The forward end of the runner C is also formed into a clip, G, engaging the wheel A in precisely the same manner as the rear clip F.

H H, as heretofore referred to, are two catch-springs, secured to the guards B' with one of their extremities, and provided on their opposite ends with barbs $h$, overlapping the flap D at the offsets E. These springs, when lifted upward, release the flap D, which may then be turned down in a horizontal position, and thus serve as a track for the wheel A to run upon when being placed into or removed from the runner.

It will be readily observed that the wheel A is clamped, by means of the clips F and G, at diametrically opposite places, and thus prevented from revolving.

If desired, chains may be attached to the runner C in the eye K, and these chains hitched to the vehicle in any suitable manner. When not in use the sled-runners may be placed upon the vehicle.

The advantages of a sled-runner attachment to wheeled vehicles are manifold, inasmuch as it dispenses with the necessity of keeping both a wagon and sleigh. A wagon or other wheeled vehicle may be readily converted into such at a few moments' notice, so that during winter, when sudden changes in the temperature of the atmosphere convert a good sleighing road within a few hours into the most unendurable thoroughfare, and render a sleigh more than useless, or vice versa, my sled-runner attachment may be readily attached to or removed from the wheels by removing the nuts and plates on the clips F and G and turning down the flaps D.

Having thus fully described my invention, I claim as new and desire to secure by Letters Patent of the United States—

The sled-runner attachment for wheeled vehicles, consisting essentially of the runner C, having its forward end provided with the clip or clamp G, the guards B', the hinged flap D, with the offsets E and clip or clamp F, and the catch-springs H, the whole constructed and arranged for attachment to a wheel, substantially as and for the use and purpose specified.

In testimony that I claim the foregoing as my invention I have hereto set my hand and affixed my seal in the presence of two subscribing witnesses.

FRED. KUEMPEL. [L. S.]

Attest:
 MICHAEL J. STARK,
 FRANK HIRSCH.